No. 729,200. PATENTED MAY 26, 1903.
W. MILLER.
BAND SAW GUIDE.
APPLICATION FILED MAR. 6, 1903.
NO MODEL.
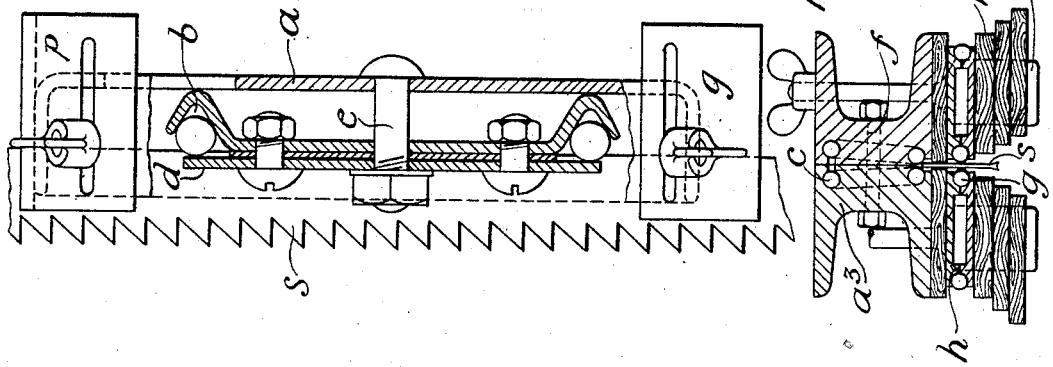
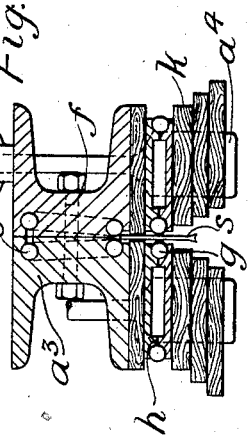
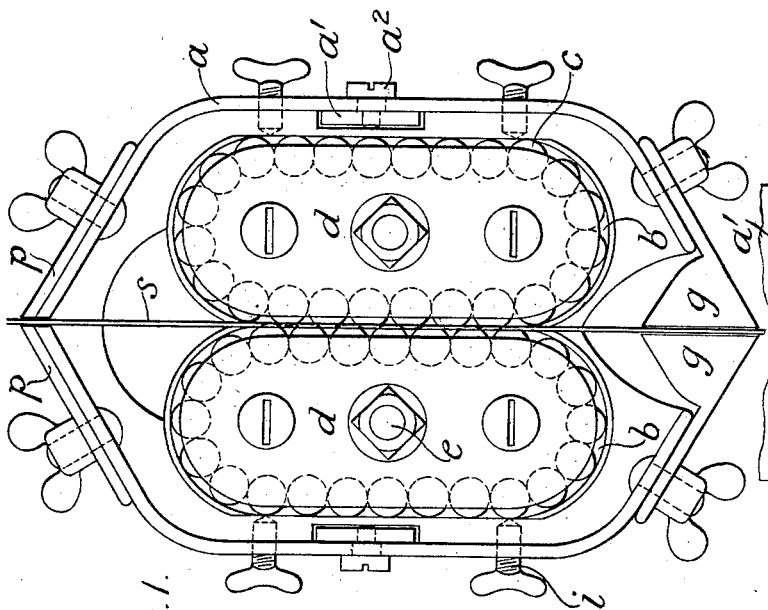
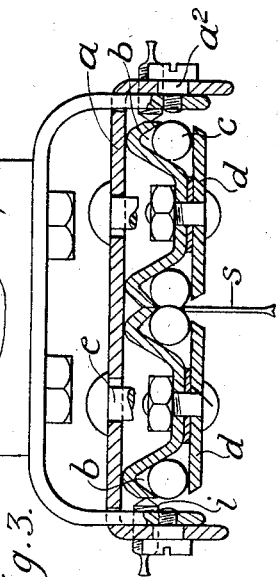
Witnesses
Inventor
Wm. Miller
by
Attorney No. 729,200. Patented May 26, 1903.

UNITED STATES PATENT OFFICE.

WILLIAM MILLER, OF FALKIRK, SCOTLAND.

BAND-SAW GUIDE.

SPECIFICATION forming part of Letters Patent No. 729,200, dated May 26, 1903.

Application filed March 6, 1903. Serial No. 146,520. (No model.)

*To all whom it may concern:*

Be it known that I, WILLIAM MILLER, a citizen of the United Kingdom of Great Britain and Ireland, residing at 134 Elmbank Terrace, Falkirk, Scotland, have invented certain new and useful Improvements in Band-Saw Guides, (for which application has been made in Great Britain, No. 17,556, dated August 11, 1902,) of which the following is a specification.

This invention relates to guides for band-saws; and it has for its object to provide a guide of improved construction wherein the saw is guided at the back or at the back and sides by balls running in ball-races on each side thereof.

The invention is illustrated by the accompanying drawings, in which—

Figure 1 is a front elevation, Fig. 2 a sectional side elevation, and Fig. 3 a horizontal section, of the improved band-saw guide. Fig. 4 is a horizontal section showing a modified construction of the saw-guide.

The improved saw-guide, which comprises a shallow casing $a$, supported by a bracket $a'$ in any usual way and preferably mounted as shown on pivot-centers $a^2$, so that the casing may accommodate itself to inclination of the saw, is formed by two ball-races $b\,b$ of oblong form, one race being on each side of the path of movement of the saw $s$ and so close that when filled with balls $c$ those in one race come into contact and interlace with those in the adjoining race, and the back of the saw runs between the sets of balls and is supported by them at such a point on the periphery of each that the balls $c$, being rotated by frictional contact with the back of the saw, are thereby traversed around the ball-races $b\,b$ at a slower speed than that of the saw. The ball-races $b\,b$ may be in the same plane transversely of the saw band or blade, as shown at Figs. 1, 2, and 3, or in planes parallel to the blade, as shown at Fig. 4.

To prevent sawdust being carried into the ball-races, a scraper is provided and composed of two plates $p$, adjustably secured to the casing $a$, one on each side of the saw, and at the lower side of the casing adjustable metal side guides $g$ are also provided.

In the example shown by Figs. 1, 2, and 3 the balls $c$ are held from dropping out of the races $b$ by means of face-plates $d$, which are secured by bolts $e$ to the casing $a$.

In the modification shown at Fig. 4 the balls $c$ are held in races formed in a divided block $a^3$, the parts of which are bound together by bolts $f$.

In addition to the support provided for the back of the saw $s$ the running band or blade may be supported on each side, near its cutting-teeth, by balls $g$, running in races $h$, one on each side of the saw.

To provide against wear and for varying thicknesses of saws, the plates on which the ball-races are formed are adjustable toward each other and are pressed together by pinching-screws $i$ in the casing $a$. For the purpose of guiding saws of varying depths from back to cutting edge a plurality of wooden guide-slips $k$ may be fitted on the support $a$ on each side of the saw and clamped thereto, these slips being adjustable, so that any pair may be brought close up to the sides of the saw band or blade.

Having now described my invention, what I claim, and desire to secure by Letters Patent, is—

1. A saw-guide composed of a support carrying two ball-races and balls running therein so as to form two parallel rows at the back of the saw which bears upon their peripheries as described.

2. A saw-guide composed of a support carrying two ball-races and balls running therein so as to form two parallel rows at the back of the saw and two ball-races having balls running therein in parallel rows to bear on the sides of the saw as described.

In witness whereof I have hereunto set my hand in presence of two witnesses.

WILLIAM MILLER.

Witnesses:
 WALLACE CRANSTON FAIRWEATHER,
 JOHN ARMSTRONG, Jr.